July 14, 1925.
M. G. ANTON
1,546,114
LUGGAGE CARRIER
Filed May 10, 1924
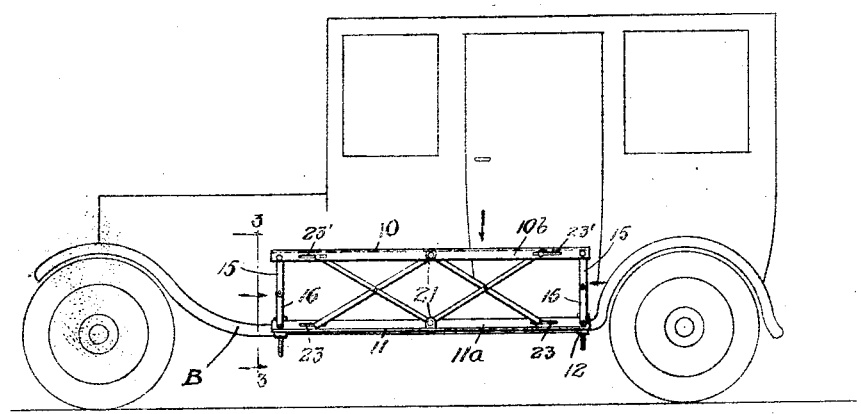
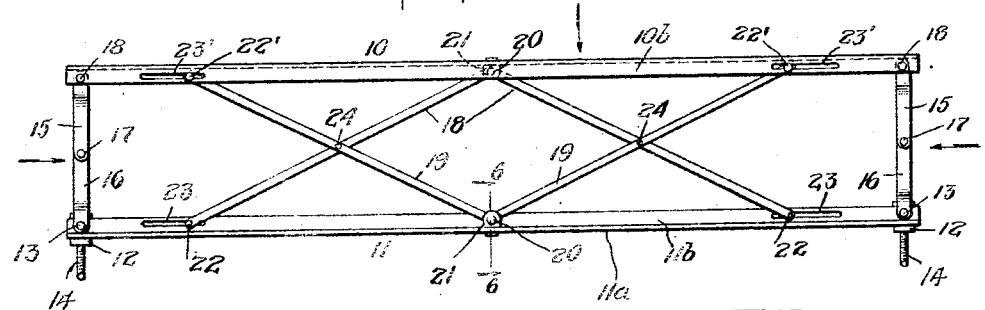
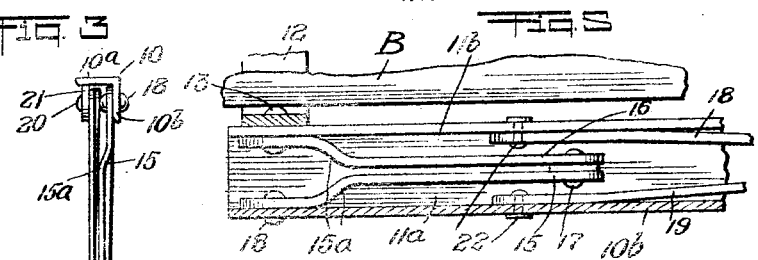
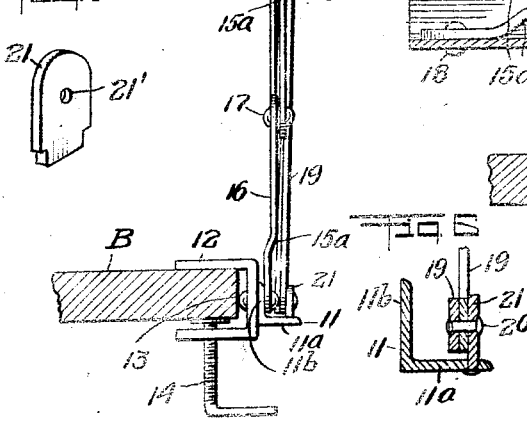
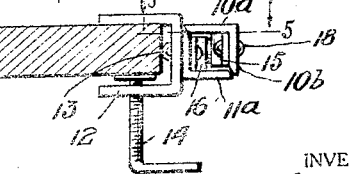
INVENTOR
M. G. Anton
BY Geo. L. Beeler
ATTORNEY Patented July 14, 1925.

1,546,114

UNITED STATES PATENT OFFICE.

MARK G. ANTON, OF EAST ORANGE, NEW JERSEY, ASSIGNOR TO MARK ANTON MANUFACTURING COMPANY, OF BELLEVILLE, NEW JERSEY, A CORPORATION OF NEW JERSEY.

LUGGAGE CARRIER.

Application filed May 10, 1924. Serial No. 712,214.

*To all whom it may concern:*

Be it known that I, MARK G. ANTON, a citizen of the United States, residing at East Orange, in the county of Essex and State of New Jersey, have invented certain new and useful Improvements in Luggage Carriers, of which the following is a specification.

This invention relates to automobile accessories and has particular reference to devices for attachment to the vehicle running board for the carrying or holding of suit cases or other luggage.

Among the objects of the invention is to provide a luggage carrier for an automobile running board possessing characteristics and advantages among which may be noted the following: A device of the nature set forth of the simplest and cheapest possible construction consistent with strength, durability, and reliability; one that may be carried as a permanent attachment to the vehicle and which may be extended upward from its plane of attachment with the running board for luggage carrying purposes or collapsed downward flush with or below the tread surface of the running board when not required for luggage carrying purposes and where it will constitute in effect a part of the running board and upon or over which a person may step in entering or leaving the vehicle, and other features of construction or advantage will be referred to hereinafter.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation indicating a diagram of an automobile equipped with my improvement.

Fig. 2 is an enlarged front elevation of my improvement in extended position.

Fig. 3 is a still larger end elevation as from the plane of the line 3—3 of Fig. 1.

Fig. 4 is a similar view in collapsed position.

Fig. 5 is a fragmentary partial plan and partial section on the line 5—5 of Fig. 4.

Fig. 6 is a vertical transverse sectional detail on the line 6—6 of Fig. 2.

Fig. 7 is a detail view of one of the attachment lugs.

Referring now more specifically to the drawings I show my improved luggage carrier as of the type which I am making extensively, the same comprising a pair of upper and lower bars 10 and 11 of equal predetermined length and consisting preferably of steel angle members or their equivalent. The upper bar has a flange $10^a$ lying in a horizontal plane and a flange $10^b$ depending from the front edge thereof, while the lower or fixed bar 11 comprises a horizontal flange $11^a$ and a vertical flange $11^b$ extending upward from the rear edge thereof so that when the upper bar is moved downward into folded or nested position the four flanges form practically a hollow square and each effectively reinforces the other, adding materially to the rigidity and strength of the construction whereby a person entering or leaving the car may safely tread directly upon the nested construction.

As a convenient means for securing the device to the running board B I provide a plurality of clips 12, preferably one for each end of the structure and each in the form of a rectangular U, the crotch portion of which is fixed by means of a strong rivet 13 to the vertical flange $11^b$ of the lower bar. One lug or jaw of the clip embraces the tread surface or top of the running board while the other lug or jaw extends beneath the running board and has extending through it a locking member such as a screw 14 which when tightened upward against the bottom of the running board makes a strong and permanent attachment, or as permanent as desired for practical purposes.

Adjacent to each end of the structure is a toggle comprising upper and lower links 15 and 16 respectively pivoted to each other at 17. The upper end of the upper link is pivoted at 18 to the depending flange $10^b$ while the lower end of the lower link is shown as pivoted upon the rivet 13. These points of connection between the toggle links and the main bars being in vertical planes offset from each other, I have constructed the links with offsets preferably adjacent to the bar connections as shown at 15ª, Fig. 5, so that each link has two end or main portions lying in substantially parallel planes and with the two portions of the two links adjacent to the pivot 17 connecting them close together for a purpose soon to appear. To extend the device for carrying purposes the upper bar 10 is simply lifted upward bodily separating it from the lower bar 11 as far as will be permitted by the toggle links, the links at such time straightening and serving thereafter as positive braces to prevent undesired collapse of the structure. See Fig. 2.

In folding over the joints at the pivots 17 are broken inward toward each other so that the toggle links assume the position shown in Fig. 5 between or within the two angle bars.

Any suitable lattice work or auxiliary bracing means may be provided between the two main bars. For this purpose I indicate pairs of lazy tongs 18 and 19 having their ends pivoted or movably connected to the upper and lower bars respectively. The upper ends of the links 18 are pivoted at 20 upon a strong lug 21 having a shank fitted in the horizontal flange 10ª near the free edge thereof and depending vertically therefrom. This lug 21 is made preferably as a stamping of sheet metal of uniform thickness and provided with a transverse hole 21'. The lower or remote ends of the links 18 are fitted with pins 22 projecting rearward horizontally through slots 23 formed in the vertical flange 11ᵇ of the lower bar. The other links 19 are similarly constructed and are pivoted at their adjacent ends upon a pivot 24 extending through a lug 21' fitted in the front edge portion of the horizontal flange 11ª of the main bar, and the remote ends of these links 19 are fitted with guide pins 22' operating in slots 23' formed longitudinally along the vertical flange 10ᵇ of the upper bar. Each pair of links 18 and 19 are furthermore jointed or pivoted together at their centers at 24. The lazy tongs or pairs of links 18 and 19 serve not only as guards or closures for the luggage carrier, serving to retain effectually the luggage in place, but also they constitute supplemental braces or truss members for the entire construction, co-operating with the toggles at the ends for maintaining the parts in proper operative correlation and with the bars 10 and 11 in parallelism. When the toggles are broken inward at their joints 17, the upper bar 10 will collapse directly downward bodily toward the position shown in Fig. 4 and with the toggles and lazy tongs nested neatly and compactly between the main bars. The pins 22 and 22' at the ends of the lazy tongs during the collapsing of the device glide along the slots 23 and 23' as will be readily understood. The two lugs 21 and the links pivoted thereto respectively lie parallel to each other in the nested position between the two main bars, the lugs being fastened to the respective bars close enough to their free edges to permit this nesting, and the offsets 15ª of the toggle links provide ample clearance for the remote ends of the truss links at the sides of the toggle articulations at 17.

I claim:

1. A luggage carrier as set forth comprising, in combination, a relatively fixed lower bar having a horizontal flange and a rear vertical flange, an upper bar movable downward toward and upward from the fixed bar and comprising a horizontal flange substantially meeting the upper edge of the aforesaid vertical flange when the device is collapsed and having also a downwardly projecting vertical flange substantially meeting the free edge of the first mentioned horizontal flange, and a plurality of pairs of toggle links, the links of each pair being articulated together and with their remote ends articulated to the respective vertical flanges of said bars, said toggle links being offset laterally so as to bring their central jointed portions close along the center of the folded device, and auxiliary bracing links being provided whose remote ends lie between said close portions of the toggle links and the respective vertical flanges of the bars.

2. In a luggage carrier, the combination of a relatively fixed lower bar having a horizontal lower flange, a relatively movable upper bar having a horizontal flange, a pair of rigid lugs fixed to the respective horizontal flanges aforesaid so as to project upward and downward in close parallelism to each other when the device is collapsed, and a plurality of bracing and truss links articulated to one another and to the respective bars and foldable into close nested position between the bars when collapsed, certain of said links being connected in pairs to said lugs.

3. A foldable luggage carrier as set forth comprising a plurality of substantially parallel members movable toward each other and in closely parallel planes, a plurality of bracing and truss links pivoted to said members for holding them spaced from each other, and a pair of lugs secured to said members and in spaced relation thereto and adapted to lie side by side when said carrier is folded, said links being pivotally connected to said lugs.

In testimony whereof I affix my signature.

MARK G. ANTON.